United States Patent [19]

Ogasawara et al.

[11] E Patent Number: Re. 33,171

[45] Reissued Date of Patent: Feb. 27, 1990

[54] HYDRAULIC ELEVATOR

[75] Inventors: Tsuyoshi Ogasawara; Ken Ichiryu, both of Shimoinayoshi; Ichiro Nakamura; Yasuo Kido, both of Katsuta, all of Japan

[73] Assignee: Hitachi, Ltd., Tokyo, Japan

[21] Appl. No.: 84,205

[22] Filed: Aug. 12, 1987

Related U.S. Patent Documents

Reissue of:

[64] Patent No.: 4,534,452
Issued: Aug. 13, 1985
Appl. No.: 607,651
Filed: May 7, 1984

[30] Foreign Application Priority Data

May 6, 1983 [JP] Japan ..... 58-78261

[51] Int. Cl.[4] ..... B66B 1/04
[52] U.S. Cl. ..... 187/111
[58] Field of Search ..... 187/110, 111, 113, 116, 187/118

[56] References Cited

U.S. PATENT DOCUMENTS

| | | | |
|---|---|---|---|
| 2,669,324 | 2/1954 | Lund | 187/113 |
| 3,530,958 | 9/1970 | Brannon et al. | 187/110 |
| 3,955,649 | 5/1976 | Takenoshita et al. | 187/110 |
| 4,354,576 | 10/1982 | Kajiyama | 187/116 |
| 4,380,049 | 4/1983 | Mäkinen | 187/113 X |
| 4,446,946 | 5/1984 | Kajiyama et al. | 187/118 |

FOREIGN PATENT DOCUMENTS

| | | | |
|---|---|---|---|
| 53-145252 | 12/1978 | Japan | 187/111 |
| 54-25044 | 2/1979 | Japan | 187/111 |
| 755736 | 8/1980 | U.S.S.R. | 187/111 |

*Primary Examiner*—William M. Shoop, Jr.
*Assistant Examiner*—W. E. Duncanson, Jr.
*Attorney, Agent, or Firm*—Antonelli, Terry & Wands

[57] ABSTRACT

Disclosed is a hydraulic elevator in which the load and/or the oil temperature are detected under the running condition of a cage of the hydraulic elevator and a proper value of the deceleration delay time corresponding to this running condition is obtained to thereby control the flow of pressure-oil on the basis of the proper value of the deceleration delay time. Various values of the deceleration delay time are stored in advance in the form of table with respect to various values of load and oil temperature.

9 Claims, 3 Drawing Sheets

HYDRAULIC ELEVATOR

Matter enclosed in heavy brackets [ ] appears in the original patent but forms no part of this reissue specification; matter printed in italics indicates the additions made by reissue.

BACKGROUND OF THE INVENTION

The present invention relates to a hydraulic elevator and more particularly to a hydraulic elevator provided with a control device for correcting undesired effects on the running speed characteristic due to variation in temperature of operating oil, in load, etc.

A hydraulic elevator of the type in which speed control is performed by controlling the flow of pressure-oil supplied to or discharged from a hydraulic cylinder is known from, for example, U.S. Pat. No. 3,955,649 issued on May 11, 1976 and entitled "Device for Correcting Floor Level of Hydraulic Elevator".

In the hydraulic elevator of this type, the cage-speed control has been performed by hydraulically or mechanically actuating flow control valves in suitable sequence.

In such a control, however, the speed in acceleration, deceleration, full-running, landing or the like, may vary due to variation in oil temperature and/or load. Accordingly, the time through which a cage runs at the landing speed is prolonged, so that not only excessive power is required but also passengers may feel uncomfortable.

One approach to shorten the landing-speed running time is to delay the timing of generating a cage-deceleration instruction. In this approach, however, since the delay times in operation of various flow control valves for deceleration are fixed to predetermined values in spite of possible variations in operation characteristics of the respective flow control valves due to manufacturing and/or adjusting errors thereof, there are problems in providing a comfortable ride for passengers in that the landing-speed running time is not always constant and an error in landing may occur, even if the landing-speed running time can be shortened.

SUMMARY OF THE INVENTION

An object of the present invention is to provide a hydraulic elevator in which the time through which a cage runs at the landing-speed is controlled to a constant value to attain comfortable ride in the cage.

Another object of the present invention is to provide a hydraulic elevator in which the consumption of power can be saved.

In order to attain the above-mentioned objects, according to the present invention, in the hydraulic elevator in which a cage is moved by a hydraulic means including a cylinder and a plunger and in which a cage-deceleration instruction from a control instruction device is delayed on the basis of an output of at least one of an oil temperature detector and a load detector, there are provided a memory section for storing in advance a plurality of values of deceleration delay time arranged in the form of table, a retrieval section for retrieving one of the stored values of deceleration delay time corresponding to the operating condition of the elevator on the basis of the output of at least one of the detectors, and an arithmetic control device including a drive circuit for delaying generation of the deceleration instruction from the control instruction device by the value of deceleration delay time retrieved by the retrieval section.

DESCRIPTION OF THE PREFERRED EMBODIMENT

Figure 1:
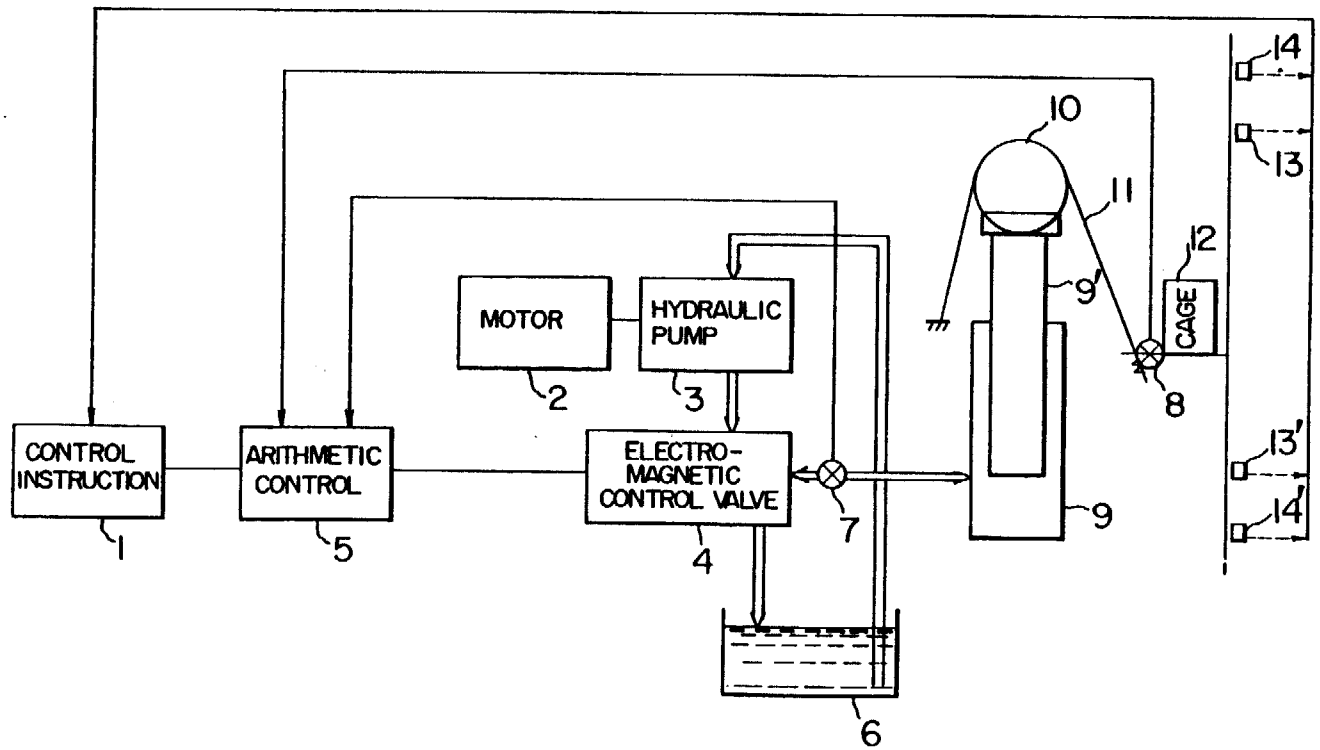
FIG. 1 is a schematic diagram showing the outline of the control system of the hydraulic elevator according to the present invention.

Referring to the drawings, an embodiment of the present invention will be described hereunder.

FIG. 1 shows the arrangement of the hydraulic elevator according to the present invention, which includes, as its main components, a control section including a control instruction device 1 and an arithmetic control device 5 such as a microcomputer having a computing function and a hydraulic drive section including an electromagnetic control valve device 4 and a hydraulic cylinder 9, and a cage 12 which is an object to be controlled. The electromagnetic control valve device 4 is energized by the arithmetic control device 5 in response to a start instruction generated from a control instruction device 1 and the flow control valve device 4 controls the flow of pressure-oil supplied from an oil reservoir 6 to the hydraulic cylinder 9 through a hydraulic pump 3 driven by an electric motor 2 of the flow of pressure-oil discharged from the hydraulic cylinder 9 to the oil reservoir 6 to thereby control the up/down movement of a plunger 9 in the hydraulic cylinder 9.

Reference numerals 7 and 8 designate detectors for detecting the temperature of oil and the load, respectively, 13 and 13' designate switches which are actuated when the cage 12 reaches predetermined deceleration-initiating points during up and down movements thereof, respectively, and 14 and 14' designate switches which are actuated when the cage 12 reaches predetermined stop positions during the up and down movements thereof, respectively.

FIG. 1, shows a system in which the cage 12 is supported by a rope 11 through a pulley 10, but the present invention can be also applied to another system in which the cage 12 is connected directly to the top end of the plunger 9'. In the illustrated system, one end of the rope 11 is fixed at a suitable stationary portion and the other end is fixed to the cage 12 so that the cage 12 moves up/down as the plunger 9' moves up/down.

Figure 2:
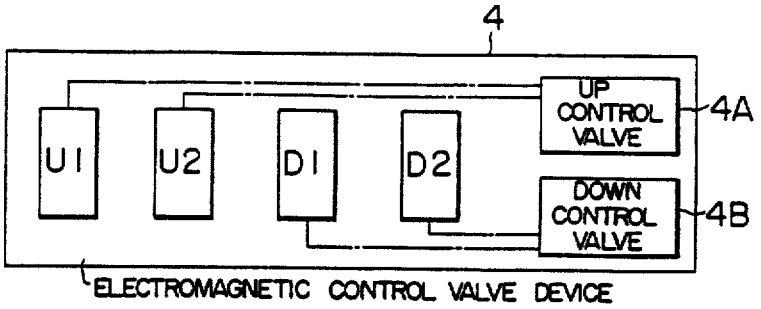
FIG. 2 is a diagram showing the arrangement of the electromagnetic valve shown in FIG. 1.
Figure 3:
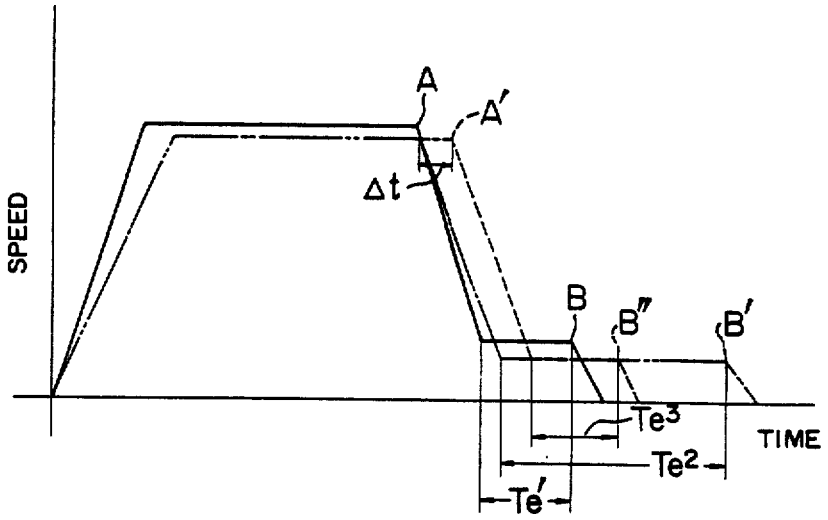
FIG. 3 is a diagram of speed characteristic of the hydraulic elevator according to the present invention as compared with that of the prior art.

As shown in FIG. 2, the electromagnetic control valve device 4 includes two solenoids U1 and U2 and an up control valve 4A for up movement, and two solenoids D1 and D2 and a down control valve 4B for down movement, so that both of the solenoids U1 and U2 (D1 and D2) are simultaneously energized in response to an up (down) start instruction generated from the control instruction device 1 and the flow of pressure-oil supplied to (drawn from) the hydraulic cylinder 9 through the up (down) control valve 4A (4B) is gradually increased so as to start and accelerate the cage 12 for up (down) movement at a full speed. When the cage 12 actuates the switch 13 (13') provided at the deceleration-initiating point, the control instruction device 1 deenergizes the solenoid U1 (D1) so that the flow of pressure-oil supplied to (drawn from) the hydraulic cylinder 9 through the up (down) control valve 4A (4B) is decreased to cause the cage 12 to begin deceleration. This point corresponds to the point A in FIG. 3. After the end of deceleration, the cage 12 runs at a constant speed (landing speed). When the switch 14 (14') provided at the stoppage position is actuated by the cage 12, the control instruction device 1 deenergizes the solenoid U2 (D2) so that the flow of pressure-oil supplied to (drawn from) the hydraulic cylinder 9 through the flow control valve device 4 is made zero to stop the cage 12. This point corresponds to the point B in FIG. 3. However, as the load of the hydraulic elevator and/or the temperature of the oil vary, the flow characteristic of the flow control valve device 4 varies, resulting in variation of speed characteristic of the cage 12. That is, the speed in acceleration, deceleration, full-running, or landing may vary. FIG. 3 shows an example of such variation. As compared with a desired running characteristic shown by a solid line, the stop timing is delayed to the point B' when the running characteristic is changed to the one as shown by a two-dotted chain line due to variation of the load and/or the oil temperature. Thus, the time Tl (landing time interval) through which the cage 12 runs at the landing-speed extends from $Tl^1$ to $Tl^2$. In the case of the value $Tl^2$ is so long, the passengers who generally expect that the door is opened immediately after the end of deceleration of the cage, may become irradiated due to delay in opening of the door and have an uncomfortable feeling. The larger the variations in load and/or oil temperature are, the larger this tendency is.

The landing-time interval Tl is set to the value $Tl^1$ taking various conditions into consideration and therefore the prolongation of $Tl^1$ to such a value $Tl^2$ is undesirable from the point of view of a comfortable ride. According to the present invention, therefore, the arithmetic control device 5 is provided to drive the electromagnetic control valve device 4 in response to the instruction signal from the control instruction device 1 so that the deceleration-initiating instruction is delayed by a deceleration delay time Δt which varies depending on the condition of the load and the oil temperature so as to cause the cage to follow the running characteristic as shown by a broken line, to thereby shorten the landing-time interval $Tl^2$ to $Tl^3$ which is substantially equal to $Tl^1$. B'' is the stop timing of the cage 12 when the deceleration initiating instruction has been delayed by the time Δt.

Figure 4:
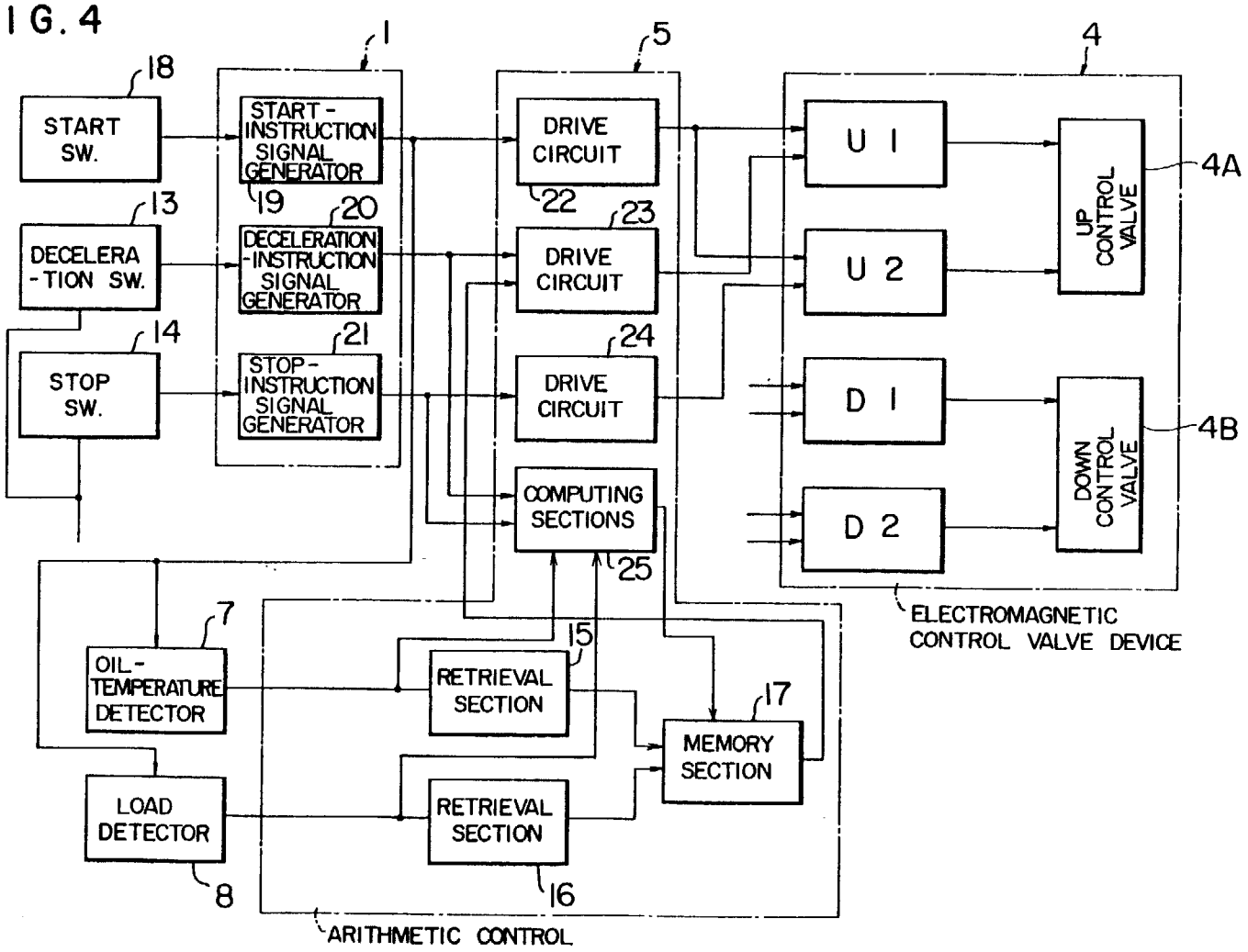
FIG. 4 is a block diagram of a main part of the arithmetic control section in the hydraulic elevator according to the present invention.

That is, as shown in detail in FIG. 4, a plurality of values of the deceleration delay time Δt corresponding to various values of the oil temperature T and the load P are previously stored in the form of a table in a memory section 17 provided in the arithmetic control device 5. The current values of the oil temperature T and the load P are detected by the detectors 7 and 8 in response to a start-instruction signal produced by a start-instruction signal generator 19 upon actuation of a start switch 18. Signals indicative of the current values are applied to retrieval sections 15 and 16, which in turn address a location of the memory section 17 corresponding to the signals applied thereto thereby reading out one of the values stored in that location. Then, upon receiving a deceleration-instruction signal from the control instruction device 1, the arithmetic control device 5 delays the deceleration instruction by the read-out value of the deceleration delay time Δt and then energizes the electromagnetic control valve device 4. Thus, it is possible to shorten the landing time interval Tl from $Tl^2$ to $Tl^3$.

Referring to FIG. 4, the operation of the hydraulic elevator according to the present invention will be now described, by way of example, with reference to the up movement thereof.

Upon turning-on a start switch 18 first, the start-instruction signal is generated from the start-instruction signal generator 19 which causes the solenoids U1 an U2 of the up control valve 4A to be energized by a drive circuit 22. Thus, the cage 12 begins to move in response to the pressure oil from the flow control valve 4A for up-movement. At this time, the actual values of the oil temperature T and the load P are detected by the detectors 7 and 8, respectively, in response to the start-instruction signal from the start-instruction signal generator 19. In accordance with the detected values of the oil temperature T and the load P, the retrieval sections 15 and 18 address a location of the memory section 17 to read out one of the plurality of values of the deceleration delay time Δt stored therein. A signal corresponding to the read-out value of the deceleration delay time Δt is applied to the drive circuit 23.

On the other hand, the cage 12 is accelerated to a full speed, and when the switch 13 disposed at the deceleration initiating position is actuated by the cage 12, a deceleration-instruction signal is generated from a deceleration-instruction signal generator 20 and applied to the drive circuit 23, which deenergizes the solenoid U1 of the up control valve 4A after a delay corresponding to the read-out value of the deceleration delay time Δt after receiving the deceleration-instruction signal. The deenergization of the solenoid U1 causes the up control value 4A to decrease the supply of pressure-oil to the hydraulic cylinder 9. The decrease of supply of the pressure-oil causes the cage 12 to decelerate to the landing-speed as shown by a broken line in FIG. 3. When the switch 14 provided at the stop position is actuated by the cage 12, a stop-instruction signal is applied to a drive circuit 24 from a stop-instruction signal generator 21 so as to deenergize the solenoid U2 of the up control valve 4A to thereby stop the cage 12. It will be readily understood that the down-movement is controlled in a similar manner by controlling the down control valve 4B through solenoids $D_1$ and $D_2$.

The values of the deceleration delay time Δt to be stored in the form of table depends on the characteristic of the flow control valve device 4 and are determined in the following manner.

Figure 5:
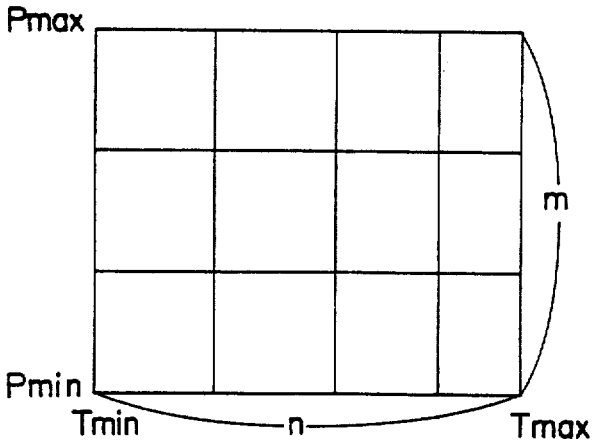
FIG. 5 is a diagram for explaining the deceleration delay time arranged in the form of table.

As shown in FIG. 5, expected ranges in variation of the oil temperature T and the load P are suitably divided into a plurality of sections, respectively, for example, the range of load P, from the minimum value $P_{min}$ to the maximum value $P_{max}$, is divided into m sections, while the range of oil temperature T, from the minimum value $T_{min}$ to the maximum value $T_{max}$, is divided into n sections so that various combinations of the temperature T and the load P are represented by M×N areas corresponding to the addressible locations of the memory section 17, in which proper values of the deceleration delay time Δt are respectively stored. The proper values of the deceleration delay time Δt are predetermined according to te values of the temperature T and the load P representing the respective areas by taking into consideration the flow control characteristics of the flow control valve device 4 as well as deviations of the characteristics thereof. If the value of deceleration delay time $\Delta t$ is optimum for the hydraulic elevator system, it is possible to make the landing time interval $Tl^3 = Tl^1$.

Different hydraulic elevators may have different characteristics due to different specifications thereof and variations in characteristic of the flow control valve device 4. Thus, the values of the deceleration delay time $\Delta t$ to be stored may be changed for different hydraulic elevators even if the combinations of the temperature T and the load P are not changed. In the case where the values of the deceleration delay time $\Delta t$ are away from optimum values, they are corrected in the following manner.

That is, values which are slightly smaller than those values which are statistically applicable to most of various cases are initially stored in the memory section 17. According to circumstances, the respective smallest values may be stored. Thus, if the values of the deceleration delay time $\Delta t$ stored in the memory section 17 are optimum for the hydraulic elevator system, it is possible to maintain the landing time interval Tl always substantially constant by using one of the values of deceleration delay time $\Delta t$ corresponding to the current values of the temperature T and the load P.

However, when the stored values of the deceleration delay time $\Delta t$ are not optimum, they are corrected in the following manner.

First, equations of the first or second degree representing a speed $V_t$ for full-speed running, a speed Vl for landing-running, and a deceleration time interval $T_1$ as a function of the load P and the oil temperature T are stored in a computing section 25. In order to correct the deceleration delay time $\Delta t$ to the safety side so that the cage is sufficiently decelerated before it reaches the stop position, the above equations are determined such that the equations give the expected maximum values of the speed $V_t$ and the deceleration time interval $T_1$ and the expected minimum value of the speed Vl. Next, respective values of the speed $V_t$ for full-speed running, the speed Vl for landing-running, and the deceleration time interval $T_1$ corresponding to the actual running condition are computed according to the equations by the computing section 25 by using the values of the oil temperature and the load detected by the detectors 7 and 8, respectively. The time difference $T_2$ between the deceleration initiating time A and the stoppage time B is also computed by the computing section 25 and stored in the memory section 17. This time difference $T_2$ can be obtained by detecting the respective signals from the deceleration-instruction signal generator 20 and the stop-instruction signal generator 21 by using, for example, a timer (not shown). Thus, the actual landing time interval Tl can be estimated by an equation $Tl = T_2 - T_1$, although it may be different from the actual value.

Then, assuming that the desired value of the landing time interval is $T^0$, a correction value $\Delta t_{ij}^*$ is calculated by an equation $\Delta t_{ij}^* = Vl/V_t\{(T_2 - T_1) - T_j^0\}$ and the delay time $\Delta t_{ij}^n$ for the area $(T_i, P_j)$ in FIG. 5 used at this time is replaced by $\Delta t_{ij}^{n+1} = \Delta t_{ij}^n + \Delta t_{ij}^*$. Thus, the delay time is changed from the value $\Delta t_{ij}^n$ to the value $\Delta t_{ij}^{n+1}$, which is used at the next time, so that the landing-time interval Tl approaches the desired value $Tl^0$ at the next running cycle.

In this manner, the value of the deceleration delay time $\Delta t$ stored in the memory section 17 becomes more and more accurate every time the hydraulic elevator completes one running cycle. Although the retrieval of the deceleration delay time $\Delta t$ and the computing for obtaining the correction value of the delay time $\Delta t$ are performed while the hydraulic elevator is running, it takes a very short time for the computing. In an emergency, however only the retrieval of the delay time $\Delta t$ is performed. Thus, during stoppage of the cage, the computing section may perform other tasks, such as to check for whether a cage call button has been pushed at any floor hall, detection of the actual position of the cage to effect control such as lighting of corresponding floor-indication lamps at the floor hall and in the cage. Further, other tasks necessary for operating the hydraulic elevator, such as judging of the state of cage waiting passengers, control of door opening/closing, etc., can be performed during the stoppage of the cage, resulting in advantages from an economical point of view.

Although both the oil temperature and the load are detected in the above-mentioned embodiment, it will do, of course, to detect only one of the oil temperature and the load in the case the other variation is small. Further, although the load is detected directly from the cage 12, it may be detected with the same effect from the pressure-oil of the hydraulic cylinder 9.

According to the present invention, it is possible to provide a hydraulic elevator in which the variations in landing time interval of the cage due to variations in load and/or oil temperature can be remarkably reduced so as to make always constant the time interval through which the cage runs at the landing-speed to provide a comfortable ride. Further, since the landing time interval is shortened, it is possible to expect the saving of consumption of the power.

We claim:

1. In a hydraulic elevator system in which a cage is moved by hydraulic means including a cylinder and a plunger, a control apparatus comprising:

instruction means for producing a cage deceleration instruction in response to the cage reaching a predetermined deceleration position in advance of a stop position where the cage is to be stopped;

memory means for storing a plurality of values of deceleration delay time as a function of the temperature of the oil used for driving the hydraulic means and the load of the elevator;

data retrieval means connected to said memory means for retrieving one of said plurality of values corresponding to detected values of the oil temperature and elevator load; and drive means responsive to said deceleration instruction for causing said cage to begin to decelerate after expiration of a delay time corresponding to the value retrieved by said data retrieval means following the producing of said deceleration instruction by said instruction means.

2. A control apparatus according to claim 1, wherein said memory means includes a plurality of areas for storing said plurality of values, respectively, such that any one of said plurality of values is selectively readout by designating one temperature of a predetermined oil temperature range in which the detected value of the oil temperature exists and one load of a predetermined load range in which the detected value of the elevator load exists.

3. A control apparatus according to claim 2, further comprising computing means for computing correction values of the deceleration delay times stored in said memory means on the basis of the actual running characteristic of the cage, the detected value of the oil temperature and the detected value of the elevator load, including means for using said correction values for correcting the respective values stored in said memory means corresponding to said detected values of the oil temperature and the elevator load.

4. A control apparatus according to claim 3, wherein said correction value is computed on the basis of an expected full running speed of the cage, an expected landing speed of the cage and an expected deceleration time interval which are calculated as a function of the detected values of the oil temperature and the elevator load.

*5. In a hydraulic elevator system in which a cage is moved upwards or downwards by hydraulic means including a hydraulic cylinder and a flow rate control valve and said cage is decelerated in response to the cage reaching a predetermined deceleration-initiating position to reduce its speed to a lower landing-running speed, the combination of:* memory means for storing a delay time to be used for controlling the deceleration of said cage;

means for outputting an instruction so as to cause said cage to initiate the deceleration at the delay time read out of said memory means after said cage reaches said deceleration initiating position;

means for controlling the deceleration of said cage according to said instruction as outputted;

means for determining an actual landing time interval during which said cage continues to run at said lower landing-running speed, when the deceleration of said cage has been controlled by said instruction;

means for determining a landing time difference between said actual landing time interval and a desired landing time interval and for correcting said delay time based on said landing time difference; and means for renewing the delay time stored in said memory means by said corrected delay time.

*6. The combination according to claim 5, wherein said actual landing time is determined by estimation as a function of at least one of the load and the oil temperature of the hydraulic elevator system.*

*7. The combination according to claim 5, wherein said memory means stores a plurality of values of said delay time which can be selectively read out by designating the load and the oil temperature of said hydraulic elevator system.*

*8. The combination according to claim 5, wherein said memory means stores a plurality of values of said delay time which can be selectively read out by designating one of the load and the oil temperature of said hydraulic elevator system.*

*9. In a hydraulic elevator system in which a cage is moved by hydraulic means including a cylinder and a plunger, a control apparatus comprising:* instruction means for producing a cage deceleration instruction in response to the cage reaching a predetermined deceleration position in advance of a stop position where the cage is to be stopped;

memory means for storing a plurality of values of deceleration delay time;

data retrieval means connected to said memory means for retrieving one of said plurality of values corresponding to detected values of the oil temperature and elevator load; and drive means responsive to said deceleration instruction for causing said cage to begin to decelerate after expiration of a delay time corresponding to the value retrieved by said data retrieval means following the producing of said deceleration instruction by said instruction means.

* * * * *